United States Patent [19]

Katz et al.

[11] 4,259,302

[45] Mar. 31, 1981

[54] REGENERABLE AMMONIA SCRUBBER

[75] Inventors: Murray Katz, Newington; Gary A. Gruver, South Windsor; H. Russell Kunz, Vernon, all of Conn.

[73] Assignee: United Technologies Corporation, Hartford, Conn.

[21] Appl. No.: 92,314

[22] Filed: Nov. 8, 1979

Related U.S. Application Data

[63] Continuation-in-part of Ser. No. 968,597, Dec. 11, 1978, abandoned.

[51] Int. Cl.³ ............................................. B01D 53/34
[52] U.S. Cl. ................................. 423/237; 423/351; 423/238; 429/17
[58] Field of Search ............................ 423/237–238, 423/351, 648 R; 55/74; 429/17

[56] References Cited

U.S. PATENT DOCUMENTS

| 1,319,663 | 10/1919 | Davis et al. ..................... 423/237 X |
| 1,586,327 | 5/1926 | Perrott et al. ..................... 423/237 |
| 1,767,057 | 6/1930 | Dotter ..................... 423/237 |
| 3,375,140 | 3/1968 | Oswin ..................... 429/17 |
| 3,511,596 | 5/1970 | Adler et al. ..................... 423/237 |

FOREIGN PATENT DOCUMENTS

| 701001 | 12/1964 | Canada ..................... 423/237 |
| 51-55790 | 5/1976 | Japan ..................... 55/74 |

*Primary Examiner*—G. O. Peters
*Attorney, Agent, or Firm*—Stephen E. Revis

[57] ABSTRACT

Ammonia gas is scrubbed from a gas stream in a bed of material soaked with acid, and the bed is regenerated by passing an oxygen containing gas therethrough. The preferred acid is phosphoric acid and the preferred support material is carbon in the form of porous particles. In a fuel cell system dual scrubbers alternately scrub ammonia from reform gas and are subsequently regenerated so as to provide the fuel cells with a continuous flow of substantially ammonia free hydrogen.

11 Claims, 1 Drawing Figure

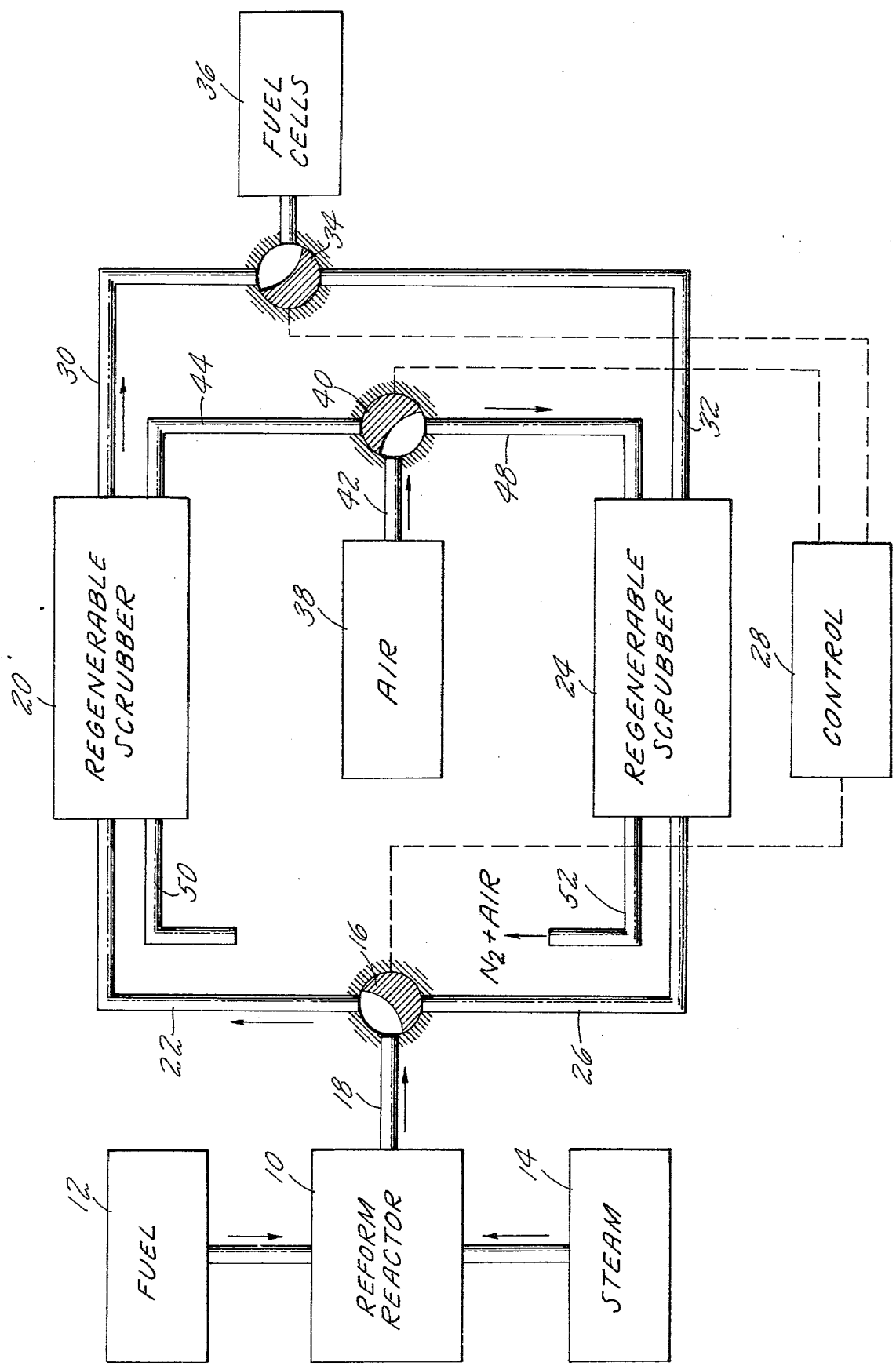

REGENERABLE AMMONIA SCRUBBER

This is a continuation-in-part application of Ser. No. 968,597, filed Dec. 11, 1978, now abandoned.

BACKGROUND OF THE INVENTION

1. Field of the Invention

The present invention relates to removing ammonia from a gas stream.

2. Description of the Prior Art

Fuel cells using acid electrolytes, such as phosphoric acid, suffer a performance decay when the fuel fed thereto contains more than 1.0 ppm, by volume, of ammonia gas. Fuels containing greater than 1.0 ppm ammonia may be cleaned to acceptable levels upstream of the fuel cells using a state-of-the-art non-regenerable bed of material which reacts with the ammonia. In a commercial fuel cell power plant designed to operate virtually maintenance free for about five years, it is certainly not desirable and can be quite expensive if the scrubber material must be replaced several times during this five year period.

In the prior art it is known that phosphoric acid reacts with ammonia to produce an ammoniated salt of the acid, and that a bed of phosphoric acid soaked porous support material can therefore be used to scrub ammonia from a gas stream. After a period of time there is insufficient unreacted acid to adequately scrub the ammonia. Prior to that time scrubbing is stopped and the bed is regenerated by increasing the vapor pressure of ammonia in the bed to greater than the vapor pressure of ammonia above the bed, which causes the salt to decompose back to the acid and ammonia. The ammonia is thereupon expelled or evaporated from the bed.

Increasing the vapor pressure of ammonia in the bed is usually accomplished by heating the bed to a temperature above the temperature used during the scrubbing process. For example, U.S. Pat. No. 3,859,417 teaches desorbing various gases from a bed of scrubbing material by raising the temperature "at least 20° C., preferably 30°-60° C. above the maximum temperature at which absorption occurs" (Col. 9, 11 33-36). The scrubbed gas is then recovered. In Canadian Pat. No. 701,001 issued Dec. 29, 1964, scrubbed ammonia is recovered by raising "the temperature in the absorption by e.g. 100° C." (page 5, 11 4-6). While always requiring at least an increased temperature for desorption, the Canadian patent also teaches that desorption may be accelerated by a carrier or sweep gas such as nitrogen, hydrogen, air or water vapor. The object, once again, is to further reduce the vapor pressure of ammonia above the bed relative to the vapor pressure in the bed.

SUMMARY OF THE INVENTION

One object of the present invention is an economical method for removing ammonia from a gas stream.

Another object of the present invention is a regenerable system for removing ammonia from a gas stream.

According to the invention ammonia gas is scrubbed from a gas stream in a bed of material soaked with acid, and the bed is regenerated by passing an oxygen containing gas therethrough. Preferably two beds are used, and while one is scrubbing ammonia from the gas stream the other is being regenerated by the oxygen containing gas. In this way a continuous flow of scrubbed gas can be provided for any desired end use.

The acid is the scrubbing medium in this regenerable ammonia scrubbing system. Phosphoric acid is preferred, but other acids, such as sulfuric acid, could also be used. The vapor pressure and chemical properties of these other acids make them much less desirable than $H_3PO_4$. The acid can be disposed on any solid, porous support material which is both wettable by the acid and corrosion resistant to the acid. Carbon is an excellent support material for phosphoric acid since it is the least expensive phosphoric acid resistant material presently known. The carbon may be in the form of, for example, activated carbon particles or pellets, or graphite particles or pellets. The carbon is believed to have a catalytic effect on the reaction involved in the regeneration of the bed. Silicon carbide is also resistant to corrosion by phosphoric acid and may also be used. Noble metals, such as platinum, would be suitable but are prohibitively expensive.

When phosphoric acid is used the chemical reaction involved in the scrubbing process is:

$$H_3PO_4 + NH_3 \rightarrow (NH_4)H_2PO_4 \qquad (1)$$

The product on the right is ammonium dihydrogen phosphate, an ammoniated salt of phosphoric acid. Before there is insufficient $H_3PO_4$ remaining in the bed to drive the reaction (1) to the right, the bed is regenerated by passing an oxygen containing gas therethrough. The effect of the oxygen is to convert the ammonium dihydrogen phosphate back to $H_3PO_4$ in accordance with the following equation:

$$2(NH_4)H_2PO_4 + 3/2O_2 \rightarrow 2H_3PO_4 + N_2 + 3H_2O \qquad (2)$$

Note that, in contrast to the prior art, ammonia is not produced by this regeneration reaction. Regeneration of the bed by this method is not dependent upon the vapor pressure of ammonia in the bed, and therefore requires no increase in temperature above the scrubbing temperature. It has actually been demonstrated that reaction (2) takes place even at ambient temperatures, although it proceeds more quickly at elevated temperatures which are, therefore, preferred. While air has been used in the prior art as a sweep or carrier gas during regeneration at temperatures exceeding the scrubbing temperature to further reduce the vapor pressure of ammonia above the bed and speed evaporation of the ammonia from the bed, air (or oxygen) has never been used to regenerate a bed at temperatures insufficient to decompose the salt of the acid and therefore insufficient to evaporate any significant amount of ammonia from the bed. Thus regeneration can and is preferably conducted such that there is no evaporation of ammonia from the bed. It is preferred to do this by maintaining the temperature of the bed during regeneration at a temperature no higher than the temperature of the bed during scrubbing. Obviously, however, the present invention is not useful when it is desired to recover the scrubbed ammonia during regeneration.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The sole FIGURE is a schematic diagram of a regenerable ammonia scrubber system according to the present invention.

DESCRIPTION OF THE PREFERRED EMBODIMENTS

An exemplary system incorporating the present invention is shown in the drawing. A conventional reform reactor 10, which includes a bed of nickel catalyst, receives fuel from a source 12 and steam from a source 14. Typical state of the art steam reformers using fuels such as natural gas containing up to 15% nitrogen or peak shaved natural gas containing propane and air can result in reform gas with from 2-8 ppm ammonia. Fuel reactors in which partial oxidation of the fuel takes place using air as the oxidant may result in ammonia concentration as high as 60 ppm.

The reform gas is directed to a valve 16 by a conduit 18. The valve diverts the gas, alternately, to a regenerable scrubber unit 20 via a conduit 22 and to a regenerable scrubber unit 24 via a conduit 26. The valve 16 is operated by a control 28.

Each scrubber unit 20, 24 contains a bed of carbon pellets which have been soaked or wetted in phosphoric acid and dried to remove residual water. The phosphoric acid in the pellets reacts with the ammonia in the reform gas and is converted to ammonium dihydrogen phosphate in accordance with equation (1) above. The ammonium dihydrogen phosphate remains on the carbon, and the scrubbed reform gas leaves the scrubber unit 20 or 24 via its respective exit conduit 30 or 32. The scrubbed gas can then be further processed, if desired or necessary. In this simplified drawing it passes through a valve 34 which, in turn, directs it to the fuel cells 36 and prevents any back flow to the other scrubber unit. The valve 34 is also operated by the control 28.

An oxygen containing gas, such as heated air from a source 38, is directed to a valve 40 via a conduit 42. The valve 40, which is operated by the control 28, diverts the heated air, alternately, to scrubber unit 20 via a conduit 44 and to scrubber unit 24 via conduit 48, whichever is not, at the time, receiving the reform gas. The oxygen reacts with the ammonium dihydrogen phosphate in the carbon pellets in accordance with equation (2) above, converting some of the ammonium dihydrogen phosphate back to phosphoric acid. Preferably the temperature of the air is not hot enough to result in decomposition of the salt back to ammonia. The phosphoric acid remains in the bed and can be used, once again, to scrub reform gas of ammonia. Excess air, moisture, and the nitrogen produced by reaction (2) leaves the scrubber unit 20 or 24 via its respective exhaust conduit 50 or 52.

In the drawing the valves 16, 34 are shown in a position which diverts the reform gas to the scrubber unit 20 and from the scrubber unit 20 to the fuel cells 36. The valve 40 diverts the heated air to the scrubber unit 24. After an appropriate number of hours in this mode the control 28 automatically reverses the positions of the valves 16, 34, 40, whereupon the scrubber unit 20 is regenerated while the unit 24 performs the function of scrubbing the ammonia from the gas stream. Thus, the control 28 and its associated valves alternately directs first reform gas and then heated air through each of the two scrubber units 20, 24 so that as one is scrubbing the other is being regenerated; and a continuous supply of scrubbed reform gas is thereby made available to the fuel cells.

Although heated air is the regenerating medium in the drawing, an excellent alternative source of oxygen is the hot oxidant effluent from the fuel cells 36.

Tests were conducted to determine the effectiveness of phosphoric acid soaked carbon pellets in the scrubbing of ammonia from a gas stream. In one test the carbon pellets used were Breedmore Research Grade from Breedmore Aquarium Products, Ltd. of Shohola, Pennsylvania. The pellets varied in size but were mostly about three-sixteenths inch in diameter by one-quarter inch long. They were soaked in 99% phosphoric acid for 24 hours, then drained, and finally heated to drive off any excess water. The scrubber material was packed into a stainless steel tube which was gold coated on the interior to provide acid corrosion protection. The active length of the bed was 4.0 inches and the diameter approximately five-eighths inch. The total weight of the bed materials was 20 grams of which 9.4 grams was phosphoric acid. The bed was operated at a temperature of about 380° F. at ambient pressure. The gas stream was hydrogen saturated to a 130° F. dew point and containing an average ammonia content of 180 ppm during the entire test. A constant flow rate of 4 cc/sec was used, which is equivalent to a space velocity of 500 cc per hour per cc of bed. The ammonia concentration of the exiting gas stream was periodically monitored. It averaged 0.5 ppm for more than 450 hours whereupon breakthrough started to occur. At this point about 55% of the phosphoric acid in the bed had been converted to ammonium dihydrogen phosphate. At 565 hours the exit concentration was not much different from the inlet concentration.

In a subsequent test a similar scrubber reduced an ammonia inlet concentration of 5 ppm down to about 0.06 ppm. In this case breakthrough also occurred after approximately 55% of the phosphoric acid in the bed had been utilized. The extent of acid utilization at the time of breakthrough depends on the bed geometry and the physical properties of the support material. Breakthrough will occur when there is insufficient available phosphoric acid in the support to react with the ammonia in the gas stream.

A test was also run to determine how effectively an ammoniated bed could be regenerated. A scrubber was preammoniated to a 45% ammoniated level. In other words, 45% of the phosphoric acid in the carbon pellets was converted to ammonium dihydrogen phosphate. The scrubber bed was maintained at 380° F. and wet air having a 150° F. dew point was passed through the scrubber at a space velocity equal to 125 cc per hour per cc of bed. Within about 100 hours the level of ammoniation had dropped from 45% to about 25%. Several hundred additional hours of operation failed to produce further significant regeneration.

To determine the effect of temperature on the regeneration process another test was run at ambient temperatures starting out with a 55% ammoniated bed. Although regeneration occurred, it occurred at a slow rate. After 500 hours the ammoniation level had been reduced from 55% to only about 43%. Thus, the advantages of heating the scrubber bed or using a heated oxygen containing gas are apparent.

Another test was conducted in which a bed of phosphoric acid soaked carbon pellets was alternately used as a scrubber and then regenerated. The inlet ammonia concentration in the hydrogen stream varied from 12 to 162 ppm, by volume and averaged about 60 ppm. The flow rate was 4 cc/sec and the bed temperature was maintained at 380° F. during both scrubbing and regenerating. After thirteen (13) cycles and more than 4000 hours of operation (total scrubbing and regenerating time) the bed was still able to scrub ammonia from the hydrogen stream to a level of less than 0.5 ppm ammonia.

Another test was conducted to confirm that the bed was being regenerated solely by the reaction (2) above and not by the evaporation of ammonia from the bed. In this test, an ammoniated bed of carbon pellets was regenerated at 380° F. using a gas stream consisting of oxygen and helium in a ratio simulating the partial pressure of oxygen in air. (Basically the helium replaced the nitrogen normally contained in air.) The composition of the exiting gas was measured and it was found to include free nitrogen in the same amount as was lost from the ammoniated bed. No measurable amount of ammonia was present in the exiting gas.

The cost savings associated with the present invention increase as the ammonia level being handled increases. It is estimated that costs for scrubber bed materials over a five year period of operation could be reduced by a factor of about 75 in comparison to state-of-the-art non-regenerable scrubbers.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. In the continuous removal of ammonia gas from a gas stream, the steps of:
providing dual beds of solid, porous material wetted with an acid;
removing ammonia gas from the gas stream by reacting the ammonia in the gas stream with the acid to form an ammoniated salt of the acid on said porous material by alternately passing the gas stream through one and then the other of said beds said beds being maintained at a first temperature during said step of reacting;
regenerating each bed during the time it is not receiving the gas stream by reacting oxygen with said salt to form nitrogen, said acid, and water by passing an oxygen containing gas therethrough, said beds being maintained at a second temperature during regenerating insufficient to decompose said salt and evaporate any significant amount of ammonia from said beds during regenerating.

2. The continuous removal of ammonia gas from a gas stream according to claim 1 wherein said second temperature is no greater than said first temperature.

3. The continuous removal of ammonia gas from a gas stream according to claim 1 wherein said acid is phosphoric acid.

4. The continuous removal of ammonia gas from a gas stream according to claim 1 wherein said wetted material is carbon.

5. The continuous removal of ammonia gas from a gas stream according to claim 3 wherein the gas stream is a reform gas stream.

6. The continuous removal of ammonia gas from a gas stream according to claim 2 wherein the oxygen containing gas is air.

7. The continuous removal of ammonia gas from a gas stream according to claim 3 wherein said gas stream includes greater than 1.0 ppm ammonia and the step of reacting includes reacting in each bed until less than 1.0 ppm ammonia remains in the gas stream.

8. The continuous removal of ammonia gas from a gas stream according to claim 3 wherein said wetted material is carbon, the oxygen containing gas is the oxidant effluent from fuel cells, and the step of regenerating is conducted at above ambient temperatures.

9. In the continuous removal of ammonia gas from a gas stream, the steps of:
providing dual beds of porous carbon wetted with phosphoric acid;
reacting the ammonia in the gas stream with the phosphoric acid to form a salt of the acid in the porous carbon by alternately passing the gas stream through one and then the other of said beds;
regenerating each bed at above ambient temperatures during the time it is not receiving the gas stream by reacting oxygen with said salt to form nitrogen, phosphoric acid, and water by passing an oxygen containing gas therethrough, said regenerating temperature being insufficient to decompose said salt and evaporate any significant amount of ammonia from said beds during regenerating.

10. The continuous removal of ammonia gas from a gas stream according to claim 9 wherein said gas stream includes greater than 1.0 ppm ammonia and the step of reacting includes reacting in each bed until less than 1.0 ppm ammonia remains in the gas stream.

11. The continuous removal of ammonia gas from a gas stream according to claim 9 wherein the oxygen containing gas is the oxidant effluent from fuel cells, and the regenerating temperature is no greater than the temperature of the bed during the step of reacting the ammonia.

* * * * *